United States Patent
Kim et al.

(10) Patent No.: US 8,780,781 B2
(45) Date of Patent: Jul. 15, 2014

(54) METHOD AND APPARATUS FOR RECEIVING MULTICAST AND BROADCAST SERVICE IN A BROADBAND WIRELESS COMMUNICATION SYSTEM

(75) Inventors: Jeong-Ki Kim, Gyeonggi-Do (KR); Kiseon Ryu, Gyeonggi-Do (KR); Youngsoo Yuk, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 13/392,336

(22) PCT Filed: Aug. 30, 2010

(86) PCT No.: PCT/KR2010/005848
§ 371 (c)(1),
(2), (4) Date: Feb. 24, 2012

(87) PCT Pub. No.: WO2011/025335
PCT Pub. Date: Mar. 3, 2011

(65) Prior Publication Data
US 2012/0155367 A1 Jun. 21, 2012

Related U.S. Application Data

(60) Provisional application No. 61/237,704, filed on Aug. 28, 2009, provisional application No. 61/247,550, filed on Sep. 30, 2009.

(51) Int. Cl.
*H04H 20/71* (2008.01)
*H04W 72/00* (2009.01)
*H04B 7/26* (2006.01)

(52) U.S. Cl.
CPC ........... *H04W 72/005* (2013.01); *H04B 7/2656* (2013.01)
USPC ....................................... 370/312

(58) Field of Classification Search
USPC ......... 370/252, 312, 329, 390, 216, 347, 389; 455/433
See application file for complete search history.

(56) References Cited

U.S. PATENT DOCUMENTS 7,346,339 B2  3/2008 Lee et al.
8,428,042 B1*  4/2013 Chion et al. .................. 370/347
(Continued)

FOREIGN PATENT DOCUMENTS

KR  10-2005-0106845 A  11/2005
WO  WO 2010041867 A2 *  4/2010

OTHER PUBLICATIONS

Intel Corporation et al., "IEEE 802.16m System Description Document (SDD)", IEEE 802.16 Broadband Wireless Access Working Group, IEEE 802.16m-09/0034, Jul. 27, 2009.

(Continued)

*Primary Examiner* — Chirag Shah
*Assistant Examiner* — Jael Ulysse
(74) *Attorney, Agent, or Firm* — Birch, Stewart, Kolasch & Birch, LLP

(57) ABSTRACT

The present specification relates to a method in which, in a broadband wireless communication system, a mobile station operates to receive multicast and broadcast service (MBS) data in the event a base station supports at least one MBS zone, wherein said method comprises: a step of receiving a first control message including at least one piece of control information from the base station; extracting, from the received first control message, control information corresponding to the MBS zone to which the mobile station belongs; and a step of receiving a second control message including MBS data burst allocation information using the extracted control information, wherein said control information contains the MBS zone identification information and/or the resource allocation information of the second control message.

6 Claims, 8 Drawing Sheets

(56) References Cited

U.S. PATENT DOCUMENTS

| | | | |
|---|---|---|---|
| 2006/0239264 A1* | 10/2006 | Kang et al. | 370/390 |
| 2007/0287449 A1* | 12/2007 | Ju et al. | 455/433 |
| 2008/0123543 A1* | 5/2008 | Do et al. | 370/252 |
| 2008/0175237 A1* | 7/2008 | Kim | 370/389 |
| 2008/0212529 A1* | 9/2008 | Kim et al. | 370/329 |
| 2009/0109890 A1* | 4/2009 | Chow et al. | 370/312 |
| 2009/0125776 A1* | 5/2009 | Cheon et al. | 714/748 |
| 2009/0147720 A1* | 6/2009 | Wang et al. | 370/312 |
| 2009/0154386 A1* | 6/2009 | So et al. | 370/311 |
| 2009/0225692 A1* | 9/2009 | Son | 370/312 |
| 2009/0274085 A1* | 11/2009 | Wang et al. | 370/312 |
| 2010/0085867 A1* | 4/2010 | Ji et al. | 370/216 |
| 2010/0202340 A1* | 8/2010 | Josiam et al. | 370/312 |
| 2010/0202371 A1* | 8/2010 | Josiam et al. | 370/329 |
| 2011/0051649 A1* | 3/2011 | Josiam et al. | 370/312 |
| 2011/0051676 A1* | 3/2011 | Josiam et al. | 370/329 |

OTHER PUBLICATIONS

Samsung et al., "Proposed Text for Section 16.9.3.1 E-MBS Configuration Indicators", IEEE 802.16 Broadband Wireless Access Working Group, IEEE C802.16m-09/2779r1, Jan. 14, 2009.

* cited by examiner

METHOD AND APPARATUS FOR RECEIVING MULTICAST AND BROADCAST SERVICE IN A BROADBAND WIRELESS COMMUNICATION SYSTEM This application is the National Phase of PCT/KR2010/005848 filed on Aug. 30, 2010, which claims priority under 35 U.S.C. 119(e) to U.S. Provisional Application Nos. 61/237,704 and 61/247,550 filed on Aug. 28, 2009 and Sep. 30, 2009 all of which are hereby expressly incorporated by reference into the present application.

BACKGROUND OF THE INVENTION

1. Field of the Invention

The present disclosure relates to a downlink control channel structure in a broadband wireless communication system, and more particularly, to a downlink control channel structure for supporting multicast and broadcast services.

2. Description of the Related Art

In the structure of Enhanced Multicast and Broadcast Service (E-MBS) MAP IE defined in the prior art, the same size of resource has been assigned to the same E-MBS data burst for each period on the basis of the assigned period. In is this case, it will be suitably applicable to multicast and broadcast services generating the same size of data packet for a predetermined period of time, such as voice traffic or radio broadcast. However, if the size of E-MBS content data decreases when the relevant IE is applied to video services for transmitting different sizes of packets, such as TV broadcast services, then the assigned resource cannot be sufficiently used, thereby causing resource consumption. If the size of data which is greater than the size of assigned resource is generated, then the generated data cannot be sent through the assigned resource, thereby causing a delay for the relevant data packet. If a delay is caused for the packet since MBS data is real time traffic, then the quality of service (QoS) cannot be satisfied.

In the conventional MBS, E-MBS has been defined by taking only one E-MBS zone in one base station into consideration. Accordingly, when a plurality of E-MBS zones are supported by one base station, the structure of E-MBS MAP should be newly defined.

SUMMARY OF THE INVENTION

An object of the present disclosure is to provide a method and apparatus for receiving E-MBS data using an E-MBS control header to support a plurality of multicast and broadcast service zones in one base station.

According to the present disclosure, there is provided an operation method of a mobile station for receiving multicast and broadcast service (MBS) data when a base station supports at least one MBS zone in a broadband wireless communication system, and the method may include receiving a first control message including at least one control information from the base station; extracting control information corresponding to an MBS zone in which the mobile station is included from the received first control message; and receiving a second control message including MBS data burst allocation information using the extracted control information, wherein the control information comprises at least one of MBS zone identification information and the resource allocation information of the second control message.

Furthermore, the method may be characterized by further including receiving a multicast and broadcast service data burst of the relevant channel using the burst allocation information.

Furthermore, the method may be characterized in that the control information further comprises information indicating whether there exists another control information additionally transmitted subsequent to the control information.

Furthermore, the method may be characterized in that the control information is an enhanced multicast and broadcast service (E-MBS) control header information element (IE).

Furthermore, the method may be characterized in that the first control message is an enhanced multicast and broadcast service (E-MBS) control header, and the second control message is an E-MBS MAP message.

Furthermore, the method may be characterized in that the second control message comprises data burst allocation information on one MBS zone.

Furthermore, the method may be characterized in that the control information comprises resource allocation information on one second control message.

Furthermore, according to the present disclosure, there is provided a control method of a mobile station for receiving a multicast and broadcast service (MBS) in a broadband wireless communication system, and the method may include receiving an MBS control message from a base station; extracting data burst allocation information on an MBS channel having a fixed period and a different resource size from the received control message; and receiving an MBS data burst of the relevant channel using the extracted data burst allocation information.

Furthermore, the method may be characterized in that the data burst allocation information comprises at least either one of resource size and resource indexing on each multicast and broadcast data burst.

Furthermore, the method may be characterized in that the control message is an enhanced multicast and broadcast service (E-MBS) MAP message.

Furthermore, according to the present disclosure, there is provided a mobile station apparatus for receiving multicast and broadcast service (MBS) data when a base station supports at least one MBS zone in a broadband wireless communication system, and the apparatus may include a receiver configured to receive a first control message including at least one control information from the base station; a message interpreter configured to extract control information corresponding to an MBS zone in which the mobile station is included from the received first control message; and a controller configured to control the operation of receiving a second control message including MBS data burst allocation information using the extracted control information, wherein the control information comprises at least one of MBS zone identification information and the resource allocation information of the second control message.

According to the present disclosure, an enhanced multicast and broadcast data information element (E-MBS DATA IE) for transmitting data for MBS services such as video traffic or TV is defined, thereby having the effect of reducing unnecessary resource consumption and a packet delay time.

Furthermore, E-MBS control headers are defined as many as the number of E-MBS zones, thereby having the effect of providing multicast and broadcast services for one or more E-MBS zones by one base station.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
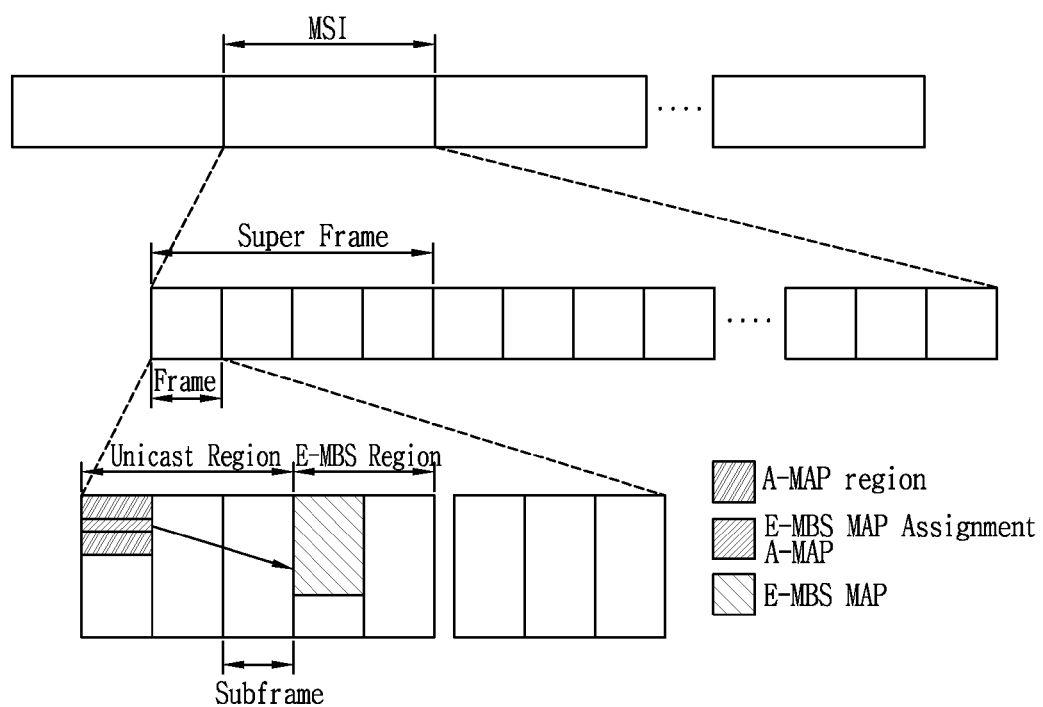
FIG. 1 is a view illustrating a case where an E-MBS zone is multiplexed with a unicast zone using a time division multiplexing (TDM) scheme within one frame.

In the following embodiments, the constituent elements and features of the present disclosure are combined with one another in a predetermined form. Each constituent element or feature thereof should be considered to be selective as unless otherwise particularly specified. Each constituent element or feature thereof may be implemented in a form that is not combined with any other constituent elements or features. Furthermore, an embodiment of the present disclosure may be also configured by combining some of the constituent elements and/or features. The sequence of the operations described in the embodiments of the present disclosure may be changed. Some of the configurations or features of any embodiment may be included in any other embodiments, or may be replaced with the configurations and features corresponding to the any other embodiments.

In the description of drawings, procedures, steps, or the like which are judged to obscure the gist of the present disclosure are not described herein, and procedures or processes that can be understood by those skilled in the art are not also disclosed herein.

Embodiments of the present disclosure are described mainly in relation to the transmission and reception of data between a base station and a mobile station. Here, the base station has also the meaning of a terminal node of a network, which directly performs communication with the terminal. In this disclosure, a specific operation described to be performed by a base station may be carried out by an upper node of the base station if necessary.

In other words, it should be understood that various operations carried out for the communication with a terminal in a network comprised of a plurality of network nodes including a base station can be carried out by the base station or other network nodes except the base station. The term "base station" may be replaced by a term such as fixed station, Node B, eNode B (eNB), access point, or the like. Furthermore, the term "terminal" may be replaced by a term such as UE (user equipment), MS (mobile station), MSS (mobile subscriber station), or the like.

Moreover, a transmitting side refers to a node configured to transmit a data or speech service and a receiving side refers to a node configured to receive the data or speech service. Therefore, in uplink, a mobile station may be a transmitting side and a base station may be a receiving side. On the contrary, in downlink, a mobile station may be a receiving side and a base station may be a transmitting side.

Meanwhile, a mobile station of the invention may include a personal digital assistant (PDA), a cellular phone, a personal communication service (PCS) phone, a global system for mobile (GSM) phone, a wideband CDMA (WCDMA) phone, an mobile broadband system (MBS) phone, or the like.

Embodiments of the present disclosure may be implemented through various means. For example, embodiments of the present disclosure may be implemented by hardware, firmware, software, or any combination thereof.

In case of a hardware implementation, a method according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In case of a firmware or software implementation, a method according to the embodiments of the present disclosure may be implemented in the form of a module, procedure, function, or the like which performs the functions or operations as described above. The software codes may be stored in a memory unit to be driven by a processor. The memory unit may be located at an inner or outer portion of the processor to send or receive data to and/or from the processor by various publicly-known means.

Embodiments of the present disclosure may be supported by standard documents disclosed in at least one of wireless access systems including an IEEE 802 system, a 3GPP system, a 3GPP LTE system and a 3GPP2 system. In other words, the processes or parts, which are not explained to clearly reveal the technical idea of the present disclosure in the embodiments of the present disclosure can be supported by the above documents.

Moreover, all terms disclosed in this document may be described by the above standard documents.

Specific terms used herein are provided to help understanding of the present disclosure, and the use of those specific terms may be replaced with other terms without departing from the technical concept of the present disclosure.

Prior to describing embodiments disclosed herein, the related protocol structure, downlink control channel, and the like which are to be used for E-MBS will be described below in brief.

E-MBS Protocol Structure

Enhanced multicast and broadcast services (E-MBS) may include MAC and PHY protocols which define an interaction between a mobile station and a base station. Basic definitions thereof correspond to those of MBS, but some items have been added to provide the enhanced functions and execution results. In the control plane, the E-MBS MAC functions are separately operated from the unicast MAC functions. The unicast MAC functions may be independently operated from the E-MBS MAC functions. The E-MBS MAC functions may be operated in a different manner depending on whether a mobile station is operated in an active or idle mode.

Multiplexing of Unicast Data and E-MBS Data

FIG. 1 is a view illustrating a case where an E-MBS zone is multiplexed with a unicast zone using a time division multiplexing (TDM) scheme within one frame.

An 802.16m system may use a mixed carrier to multiplex E-MBS data with unicast data within one frame. Here, both time division multiplexing (TDM) and frequency division multiplexing (FDM) schemes may be used for unicast and E-MBS traffic. When E-MBS traffic is multiplexed with unicast data within one frame, is the E-MBS traffic is time-division multiplexed with unicast traffic in a downlink subframe. In particular, E-MBS traffic is transmitted using the allocated sub-bands in the frequency domain. Furthermore, sub-channel classification for E-MBS sub-band resources is not carried out.

Figure 2:
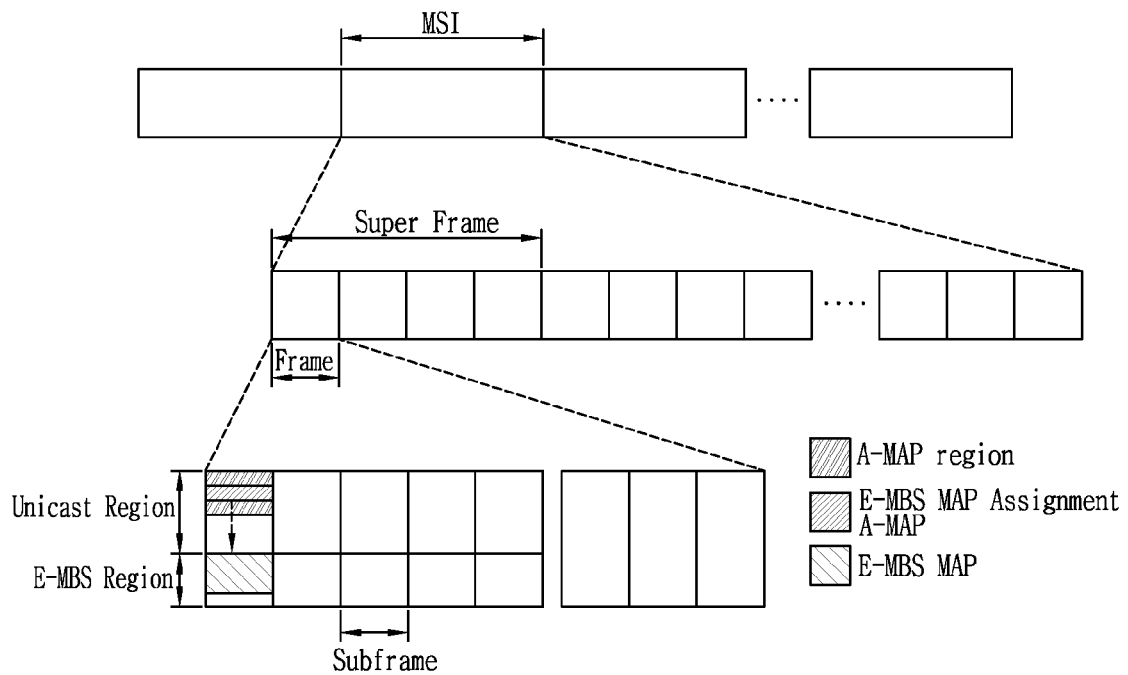
FIG. 2 is a view illustrating a case where an E-MBS zone is multiplexed with a unicast zone using a frequency division multiplexing (FDM) scheme within one frame.

FIG. 2 is a view illustrating a case where an E-MBS zone is multiplexed with a unicast zone using a frequency division multiplexing (FDM) scheme within one frame.

Frame and Control Channel Structure

Figure 3:
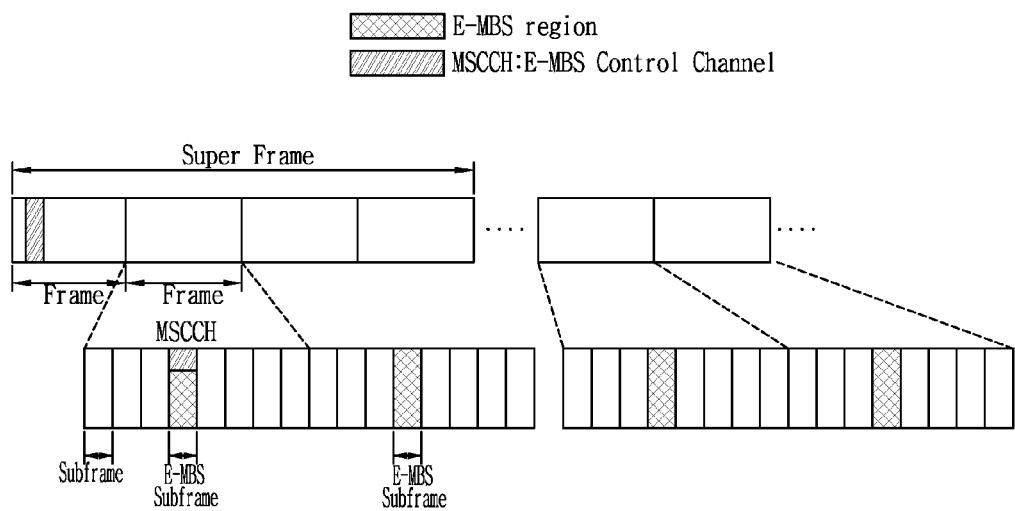
FIG. 3 is a view illustrating a frame structure when an E-MBS sub-frame exists within the superframe.

FIG. 3 is a view illustrating a frame structure when an E-MBS sub-frame exists within the superframe.

E-MBS uses the same frame structure as that of the frame used for a unicast carrier. E-MBS data is multiplexed with unicast traffic. A system description message indicates an E-MBS region capable of having a plurality of frame intervals in the MBS scheduling interval (MSI), and is configured with a set of sequential sub-bands within a downlink sub-frame for each E-MBS zone. The information on the E-MBS configuration is periodically transmitted to E-MBS related mobile stations using an MAC E-MBS control message called an AAI_E-MBS-CFG Message. The E-MBS configuration indicator describes additional information required for the E-MBS operation.

E-MBS Configuration Message

An E-MBS configuration message may include a pointer for helping the mobile station find the location of the E-MBS MAP. Furthermore, the E-MBS configuration message may include an E-MBS zone identifier for the serving base is station and neighbor base stations. Furthermore, the E-MBS configuration message may include E-MBS ID and FID mapping information between a serving E-MBS zone and a neighbor E-MBS zone for the same content.

E-MBS MAP (E-MBS Control Channel)

E-MBS MAP indicates physical layer parameters of E-MBS data channels for each E-MBS using joint coding. Furthermore, E-MBS MAP is transmitted at the beginning of E-MBS resource during one E-MBS scheduling interval. Furthermore, E-MBS MAP may indicate burst locations up to N superframes ahead in the E-MBS scheduling interval.

E-MBS MAP may include control information for E-MBS. The E-MBS MAP is configured with non-user specific control information. The non-user specific control information is further divided into basic assignment information, persistent assignment information and complex persistent assignment information. Current E-MBS MAP is transmitted from a fixed location within a superframe called a default E-MBS resource region. The default E-MBS resource region is a resource reserved for transmitting E-MBS.

The basic assignment E-MBS MAP IE is used to indicate resource allocation for E-MBS data in downlink. The CRC having a size of 16 bits is generated based on the content of the E-MBS basic assignment information element. The CRC is masked by a multicast station identifier (STID) and a flow identifier (FID).

The individual persistent assignment E-MBS MAP information element is used to indicate resource allocation for E-MBS data in downlink.

Here, allocation lifetime is a time interval indicated by its allocation lifetime. During the lifetime, the mobile station is not necessarily required to decode the E-MBS MAP, and is merely awaken from E-MBS data.

The allocation period is the number of frame offsets by which different transmissions of one content are separated from one another within MSI.

Hereinafter, in case where a plurality of MBS services are supported by one base station, the method of receiving E-MBS MAP using E-MBS MAP and an E-MBS control header will be described with reference to the drawing.

First Embodiment

A first embodiment of the present disclosure provides the method of receiving E-MBS MAP in a mobile station when a plurality of MBS services are supported by one base station.

Figure 4:
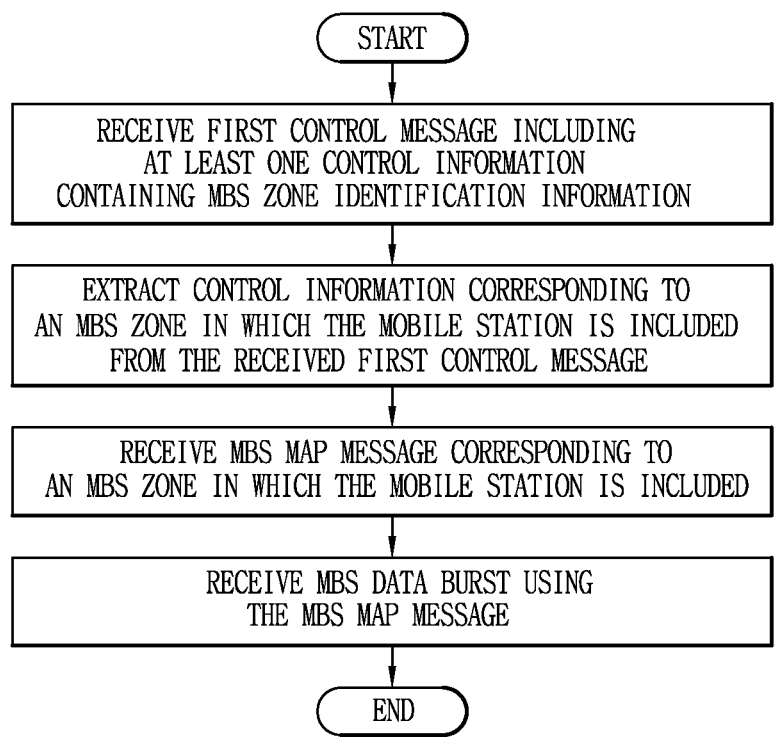
FIG. 4 is a flow chart illustrating the procedure of a receiving method of a mobile station according to a first embodiment of the present disclosure.

FIG. 4 is a flow chart illustrating the procedure of a receiving method of a mobile station according to a first embodiment of the present disclosure.

First, the mobile station receives a first control message containing one or more control information from the base station (S410). Here, the control information may be an enhanced multicast and broadcast service (E-MBS) control header information element (IE). Furthermore, the first control message may be an enhanced multicast and broadcast service control header.

Hereinafter, a case where the first control message is an E-MBS control header will be described as an example.

In case of an E-MBS control header, the control information may include MBS zone identification information and the resource allocation information of the second control message which will be described later. The second control message may be an MBS MAP message. Furthermore, the control information is may further include information indicating whether there exist another control information additionally transmitted subsequent to the control information. For example, in case where the indication information is set to "1", it indicates that another control information is transmitted subsequent to the control information. In case where the indication information is set to "0", it indicates that another control information is not transmitted subsequent to the control information.

Furthermore, in the above, the indication information refers to an identifier for identifying each E-MBS zone, and the identifier may be cyclic redundancy check (CRC)-masked with the E-MBS control header.

Furthermore, resource allocation information on the E-MBS MAP indicates a resource allocation size to which the E-MBS is allocated and modulation and coding scheme (MCS) information. Furthermore, the one E-MBS control header contains information on one E-MBS MAP.

Next, an E-MBS control header corresponding to the E-MBS zone in which the mobile station is included, i.e., E-MBS can be received from the mobile station, is extracted from the received one or more E-MBS control headers using the identification information (S420).

In case where the base station belongs to a plurality of MBS zones, there exist E-MBS control headers as many as the number of E-MBS zones. In other words, the E-MBS control header contains only information on one E-MBS MAP.

Next, a second control message containing E-MBS data burst allocation information is received by using the extracted E-MBS control header (S430).

Here, the second control message may include multicast and broadcast service data burst allocation information provided from one multicast and broadcast service zone. Furthermore, the second control message may be an E-MBS MAP message. The E-MBS MAP message contains allocation information on an E-MBS data burst provided from the relevant MBS service zone. For example, the E-MBS MAP message may include allocation periods, resource sizes, and the like for one or more E-MBS downlink channels.

Next, an E-MBS data burst of the relevant channel is received through the E-MBS data burst allocation information (S440).

The following Table 1 illustrates an example of E-MBS control header IE.

TABLE 1

| Syntax | Size | Note |
|---|---|---|
| E-MBS Control Header IE{ | — | — |
| Resource Allocation Information of E-MBS MAP | TBD[11] | Default size: 11 bits Allocation size of E-MBS MAP (LRU), MCS (or I_sizeoffset) |
| E-MBS Zone ID | 7 | Identifier of an E-MBS Zone |
| Next | 1 | Indicates whether another E-MBS Control Header IE follows this E-MBS Control Header IE 0b1: Another E-MBS Control Header IE follows this E-MBS Control Header IE |
| } | | |

Figure 5:
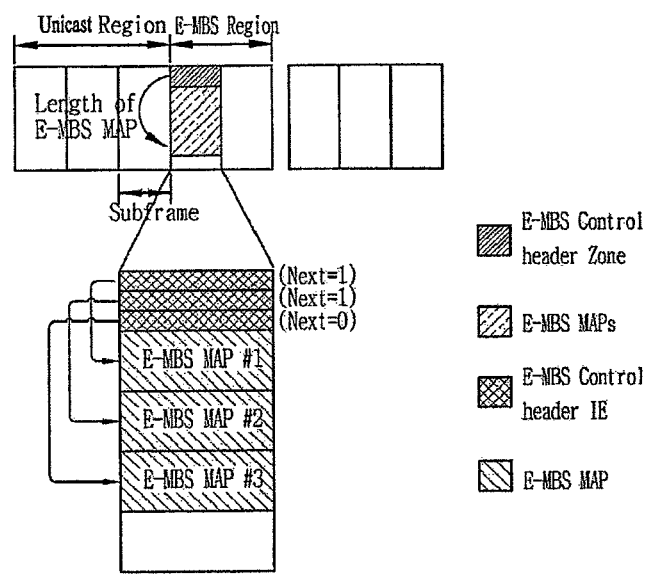
FIG. 5 is a view illustrating the configuration of an E-MBS control header and an E-MBS MAP message according to a first embodiment of the present disclosure.

FIG. 5 is a view illustrating the configuration of an E-MBS control header and an E-MBS MAP message according to a first embodiment of the present disclosure.

Referring to FIG. 5, there exist E-MBS control headers as many as the number of E-MBS zones. In other words, in case where one base station is included in a plurality of E-MBS zones, the number of E-MBS control headers is determined by the number of E-MBS zones included in the base station. Furthermore, the E-MBS control header may include information on whether another E-MBS control header is transmitted afterward. As illustrated in FIG. 5, the E-MBS control header indicates a location of resource to which an E-MBS MAP message containing resource allocation information on a data burst provided from the relevant E-MBS zone is allocated. Accordingly, a mobile station receives an E-MBS MAP message corresponding to an E-MBS zone in which the mobile station is included.

Second Embodiment

A second embodiment of the present disclosure provides the method of receiving an E-MBS data burst having a different size of resource in an environment that a base station supports a plurality of E-MBS zones.

Figure 6:
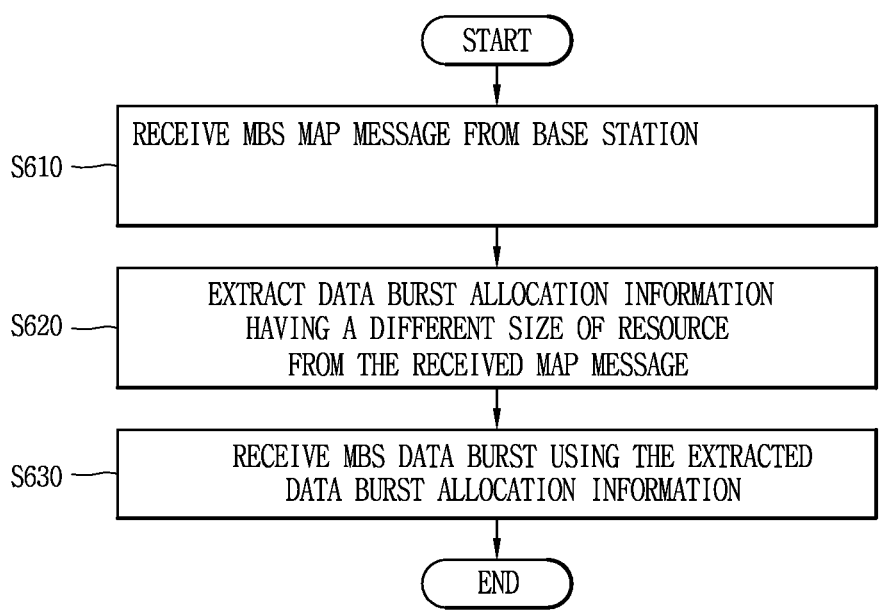
FIG. 6 is a flow chart illustrating the procedure of a receiving method of a mobile station according to a second embodiment of the present disclosure.

FIG. 6 is a flow chart illustrating the procedure of a receiving method of a mobile station according to a second embodiment of the present disclosure.

First, the mobile station receives a multicast and broadcast service control message from the base station (S610). Here, the control message may be an E-MBS MAP message.

Hereinafter, an E-MBS MAP message will be described as an example.

The E-MBS MAP message may include various E-MBS MAP information elements in case where a base station belongs to a plurality of E-MBS service zones. For example, the E-MBS MAP information element may include a basic assignment E-MBS MAP information element (IE), an individual persistent assignment E-MBS MAP information element (IE), and a persistent flexible E-MBS MAP information element (IE).

In other words, the E-MBS MAP information element may include MBS services for generating the same size of data packet for a predetermined period of time such as voice traffic (radio broadcast), and MBS services for generating a different size of data packet for each time point such as video (TV broadcast).

Next, data burst allocation information on one or more multicast and broadcast channels having a fixed period and a different resource size is extracted from the received E-MBS MAP message (S620). In other words, in case where packets are periodically generated for one content, and a different size of MBS data is generated for each period in an E-MBS MAP message, the data burst allocation information may include a resource size and resource indexing for each MBS data. The number of the resource indexing is determined based on the number of data bursts generated during the MBS scheduling interval (MSI).

Next, an E-MBS data burst of the relevant channel is received by using the extracted one or more data burst allocation information (S630).

In other words, the received E-MBS data bursts may be data packets having different sizes.

The following Table 2 illustrates an example of persistent flexible MBS_DATA IE.

TABLE 2

| Syntax | Size in bits | Description/Notes |
|---|---|---|
| Persistent Flexible MBS_DATA IE ( ){ | — | — |
| Number of bursts | [4] | The number of bursts allocated during a MSI |
| Allocation Period | [TBD] | Frame offset for multiple transmission instances |
| $I_{SizeOffset}$ | 5 | Offset used to compute burst size index, see 15.3.12.1.2 |
| E-MBS MIMO Information | TBD | TBD E.g.) E-MBS MIMO Encoding Format (SFBC/BE/ETC), Number of stream |
| MBS Frame offset | [TBD] | Include the location of the first burst. Detailed unit (Super frame/Frame/Subframe) is TBD. |
| for (i=0; I < Number of bursts; i++) { | | |
| Resource Indexing | [TBD] | Include the location and allocation size |
| Long TTI } } | | |
| } | — | — |

Figure 7:
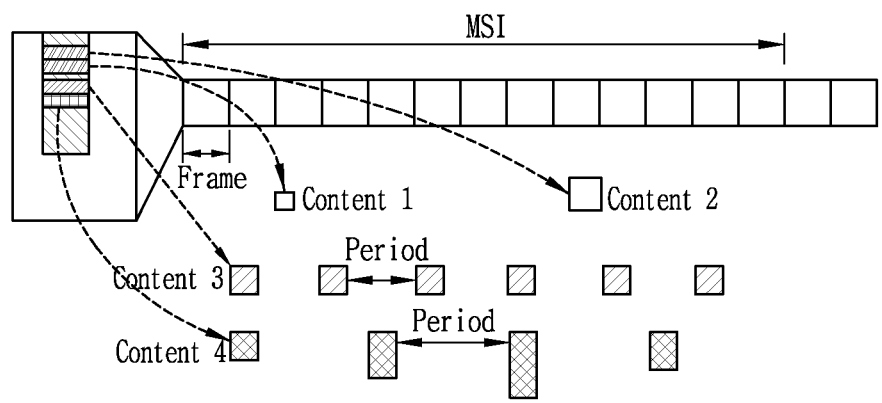
FIG. 7 is a view illustrating the example of an E-MBS data burst allocated by an E-MBS MAP message according to a second embodiment of the present disclosure.

FIG. 7 is a view illustrating the example of an E-MBS data burst allocated by an E-MBS MAP message according to a second embodiment of the present disclosure.

As illustrated in FIG. 7, the E-MBS MAP message is consisted of one or more E-MBS MAP messages, and the E-MBS MAP message may include the data burst allocation information of a service provided from one E-MBS zone. Referring to FIG. 7, the E-MBS MAP message may include at least any one of a basic E-MBS data information element, a persistent E-MBS data information element having a fixed size of resource allocated by the relevant E-MBS channel, and a persistent E-MBS data information element having a variable size of resource allocated by the relevant E-MBS channel.

The basic E-MBS data information element may include allocation information on a data burst having a variable period and size in the relevant allocated E-MBS channel.

Mobile Station Apparatus

Figure 8:
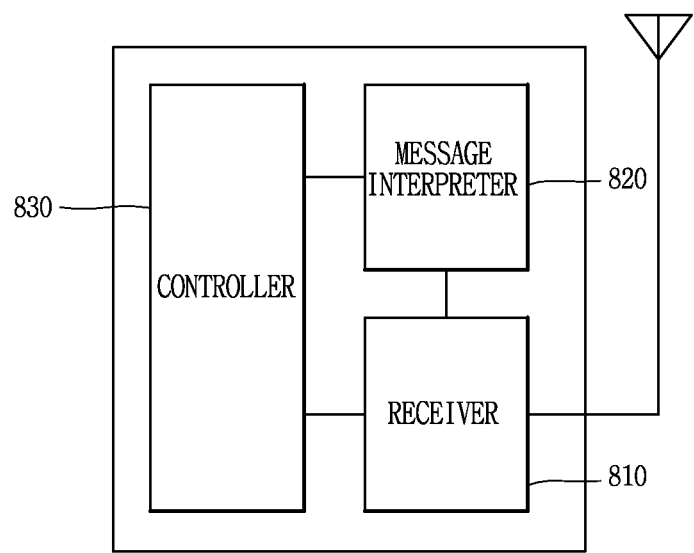
FIG. 8 is an internal block diagram illustrating a mobile station for receiving an E-MBS MAP message according to an embodiment of the present disclosure.

FIG. 8 is an internal block diagram illustrating a mobile station for receiving an E-MBS MAP message according to an embodiment of the present disclosure.

First, the mobile station may include a receiver 810, a message interpreter 820, and a controller 830.

The receiver 810 may receive a first control message containing one or more control information from the base station. Here, the control information may be an enhanced multicast and broadcast service (E-MBS) control header information element (IE). Furthermore, the first control message may be an enhanced multicast and broadcast service (E-MBS) control header.

Hereinafter, a case where the first control message is an E-MBS control header will be described as an example.

In case of an E-MBS control header, the control information may include MBS zone identification information and the resource allocation information of the second control message which will be described later. The second control message may be an MBS MAP message. Furthermore, the control information may further include information indicating whether there exist another control information additionally transmitted subsequent to the control information. For example, in case where the indication information is set to "1", it indicates that another control information is transmitted subsequent to the control information. In case where the indication information is set to "0", it indicates that another control information is not transmitted subsequent to the control information.

Furthermore, in the above, indication information refers to an identifier for identifying each E-MBS zone, and the identifier may be cyclic redundancy check (CRC)-masked with the E-MBS control header.

Furthermore, resource allocation information on the E-MBS MAP indicates a resource allocation size to which the E-MBS is allocated and modulation and coding scheme (MCS) information. Furthermore, the one E-MBS control header contains information on one E-MBS MAP.

The message interpreter 820 extracts control information corresponding to an MBS zone in which the mobile station is included from the received first control message, for example, from the E-MBS control header.

The controller 830 controls the operation of receiving a second control message containing multicast and broadcast service data burst allocation information using the extracted control information. Here, the second control message may be an E-MBS MAP message.

What is claimed is:

1. An operation method of a mobile station for receiving multicast and broadcast service (MBS) data when a base station supports at least one MBS zone in a broadband wireless communication system, the method comprising:
   receiving a first control message including at least one control information from the base station;
   extracting control information corresponding to an MBS zone in which the mobile station is included from the received first Control message; and
   receiving a second control message including MBS data burst allocation information using the extracted control information, wherein the control information is an enhanced multicast and broadcast service (B-MBS) control header information element (IE),
   wherein the E-MBS control header IE includes resource allocation information of an E-MBS NAP, E-MBS zone identification information and an indicator indicating whether there exits another E-MBS control header IE additionally transmitted subsequent to the E-MBS control header IE and wherein if the indicator has a bit value of 1, the indicator indicates that the another E-MBS control header IE follows the E-MBS control header IE.

2. The method of claim 1, further comprising:
   receiving a multicast and broadcast service data burst using the burst allocation information.

3. The method of claim 1, wherein the first control message is an enhanced multicast and broadcast service (E-MRS) control header, and the second control message is an E-MBS MAP message.

4. The method of claim 1, wherein tie second control message comprises data burst allocation information on one MBS zone.

5. A mobile station apparatus for receiving multicast and broadcast service (MBS) data when a base station supports at least one MBS zone in a broadband wireless communication system, the apparatus comprising:
   a receiver configured to receive a first control message including at, least one control information from the base station;
   a message interpreter configured to extract control information corresponding to an MBS zone in which the mobile station is included from the received first control message; and
   a controller configured to control the operation of receiving a second control message including MBS data burst allocation information using the extracted control information,
   wherein the control information is an enhanced multicast and broadcast service (E-MBS) control header information element (IE), and
   wherein the E-MBS control header IE includes resource allocation information of an E-MBS MAP, E-MBS zone identification information and an indicator indicating whether there exists another E-MBS control header IE additionally transmitted subsequent to the E-MBS control header IE and
   and herein if the indicator has a bit value of 1, the indicator indicates that the another E-MBS control header IE follows the E-MBS control header IE.

6. The method of claim 1, wherein the first control message is an enhanced multicast and broadcast service (MBS) control header, and the second control message is an E-MBS MAP message.

* * * * *